(12) United States Patent
Abdine et al.

(10) Patent No.: US 10,546,134 B2
(45) Date of Patent: *Jan. 28, 2020

(54) METHODS AND SYSTEMS FOR PROVIDING RECOMMENDATIONS TO ADDRESS SECURITY VULNERABILITIES IN A NETWORK OF COMPUTING SYSTEMS

(71) Applicant: Rapid7, LLC, Boston, MA (US)

(72) Inventors: Derek M Abdine, Los Angeles, CA (US); Anastasios Giakouminakis, Allendale, NJ (US); Chad Loder, Los Angeles, CA (US); Richard D. Li, Somerville, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,851

(22) Filed: Aug. 3, 2018

(65) Prior Publication Data

US 2019/0034640 A1    Jan. 31, 2019

Related U.S. Application Data

(63) Continuation of application No. 13/009,259, filed on Jan. 19, 2011, now Pat. No. 10,043,011.

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01)

(58) Field of Classification Search
CPC .................................................. H04L 63/1433
See application file for complete search history.

(56) References Cited

U.S. PATENT DOCUMENTS

| 7,278,163 | B2 * | 10/2007 | Banzhof | G06F 21/577 726/25 |
| 2002/0004788 | A1 * | 1/2002 | Gros | G06Q 10/0637 705/80 |
| 2010/0011000 | A1 * | 1/2010 | Chakra | G06F 21/62 707/E17.005 |

* cited by examiner

*Primary Examiner* — Simon P Kanaan
(74) *Attorney, Agent, or Firm* — Ashwin Anand

(57) ABSTRACT

A solution recommendation (SR) tool can receive vulnerabilities identified by a vulnerability scanner and/or penetration testing tool. The SR tool can determine various approaches for remediating or mitigating the identified vulnerabilities, and can prioritize the various approaches based on the efficiency of the various approaches in remediating or mitigating the identified vulnerabilities. The SR tool can recommend one or more of the prioritized approaches based on constraints such as cost, effectiveness, complexity, and the like. Once the one or more of the prioritized approaches are selected, the SR tool can recommend the one or more prioritized approaches to third-party experts for evaluation.

3 Claims, 5 Drawing Sheets

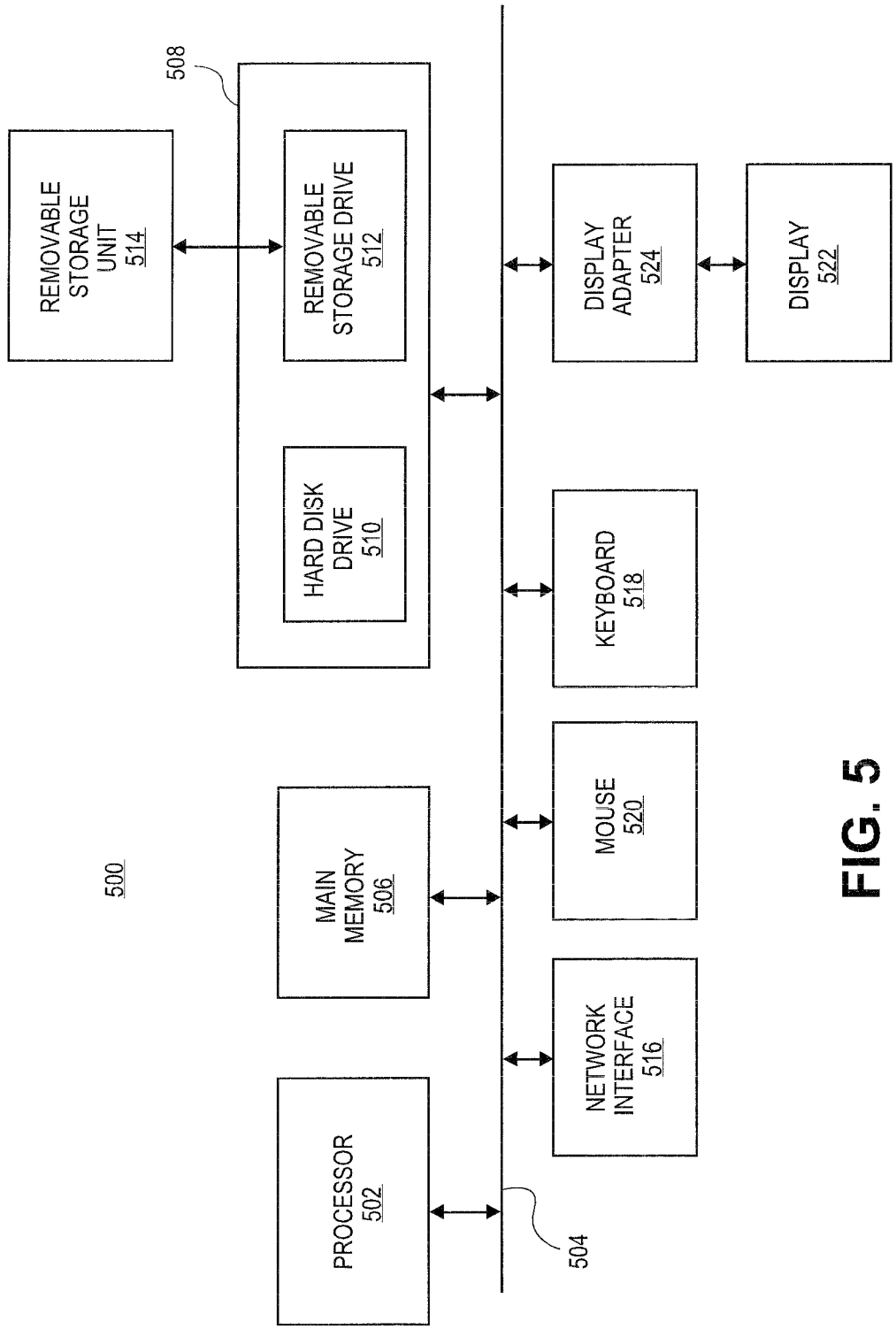

METHODS AND SYSTEMS FOR PROVIDING RECOMMENDATIONS TO ADDRESS SECURITY VULNERABILITIES IN A NETWORK OF COMPUTING SYSTEMS

FIELD

Aspects of the disclosure relate generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Additionally, the users' connection to the public networks provides a window for malicious entities to attack the user's computing systems. Malicious entities utilize this ease of accessibility and anonymity to attack the users. For example, the malicious entities can plant viruses, Trojans, or other malicious agents in publicly available content in order to attack the users' computing systems and steal sensitive information from the users and can attack the users' system remotely across the public networks.

To identify security risks in computing systems and networks, users and administrators employ vulnerability assessment and security assessment tools. These tools can identify vulnerabilities in computing systems and networks but lack the ability to provide solutions to address the vulnerabilities and direct users in implementing the solutions. Additionally, these tools lack the ability to provide solutions that address vulnerabilities and that meet certain needs of the user, such as cost constraint, technical ability, etc.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 5 is a block diagram of an exemplary computing system, according to various embodiments.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for recommending solutions to address vulnerabilities in a network of computing systems. According to embodiments, a solution recommendation (SR) tool can receive vulnerabilities identified by a vulnerability scanner and/or penetration testing tool. The SR tool can determine the vulnerability classes for the identified vulnerabilities. Once the vulnerability classes are determined, the SR tool can determine approaches based on the determined vulnerability classes (e.g. one or more solutions to remediate or mitigate the identified vulnerabilities and implementations for the solutions). The SR tool can prioritize the various approaches based on the effectiveness of the various approaches in remediating or mitigating the identified vulnerabilities, user-input constraints, and/or the effort to implement the approaches. The SR tool can recommend and/or select one or more approaches also based on constraints such as cost, effectiveness, complexity, and the like. Once the approaches are recommended and/or selected, the SR tool can provide the one or more approaches to third-party experts for evaluation.

By determining approaches that fall with constraints, an administrator of a network can identify solutions and implementations that are specifically tailored to the network. Likewise, the SR tool allows the administrator to identify solutions and implementations that meet certain needs such as cost concerns and technical expertise.

Figure 1:
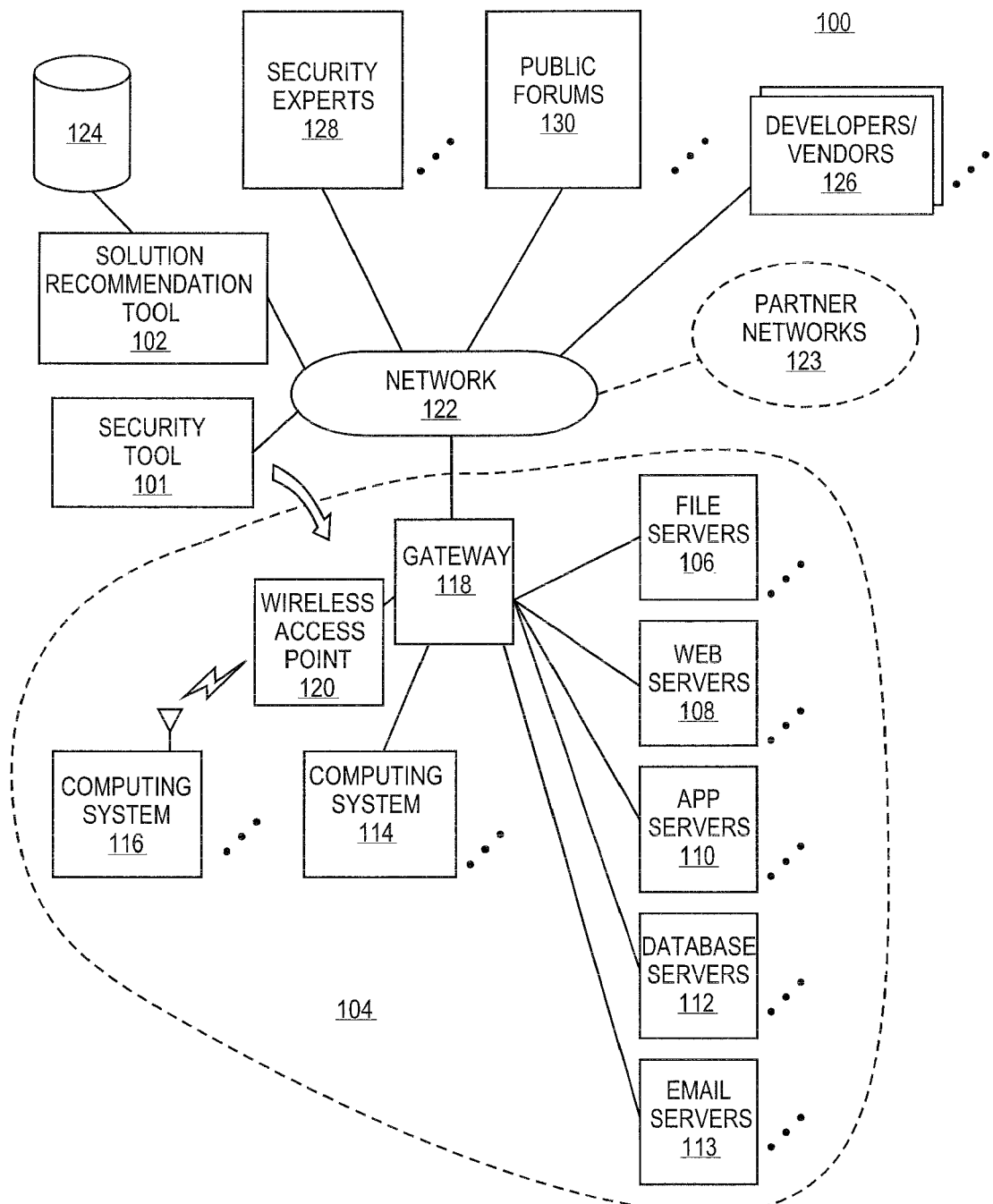
FIG. 1 is block diagram of an exemplary environment in which a solution recommendation tool can be utilized, according to various embodiments.

FIG. 1 illustrates an exemplary environment 100 in which a security tool 101 can identify vulnerabilities in a network environment 104, which potentially pose a security risk to the network environment 104, and in which a solution recommendation (SR) tool 102 can recommend approaches (e.g. solutions and implementations) to remediate or mitigate these vulnerabilities. While FIG. 1 illustrates various systems contained in the environment 100, one skilled in the art will realize that these systems are exemplary and that the environment 100 can include any number and type of systems.

As illustrated in FIG. 1, the network environment 104 can represent the computing systems and network hardware of public or private entities, such as governmental agencies, individuals, businesses, partnerships, companies, corporations, etc., utilized to support the entities. For example, as illustrated in FIG. 1, the network environment 104 can includes various types of servers such as file servers 106, web servers 108, application servers 110, database servers 112, and email servers 113. Likewise, the network environment 104 can include computing systems 114 and 116, which can be any type of conventional computing systems, such as desktops, laptops, etc, used by the personnel of the entities. The computing systems in the network environment 104 can include hardware resources, such as processors, memory, network hardware, storage devices, and the like, and software resources, such as operating systems (OS), application programs, and the like.

The network environment 104 can include other types of conventional network hardware such as gateways, routers, wireless access points, and the like that support any type of communications networks, such as wide-area networks or local-area networks whether wired or wireless, to allow the computing systems in the network environment to communicate. For example, the network environment 104 can include a gateway 118 that allows the computing systems of the network environment 104 to access a public network 122, such as the Internet. Likewise, for instance, the computing systems 116 can be connected to other computing systems of the network environment 104 by a wireless access point 118. One skilled in the art will realize that the network environment 104 can include any type of conventional network hardware that allows the computing systems of the network environment to communicate with one another.

Additionally, the network environment 104 can be connected to and communicate with one or more partner networks 123. The partner networks 123 can be separate from the network environment 104 but provide computing services to the network environment 104. For example, the partner networks 123 can provide services such as email hosting (e.g. Google™ mail), document storage services (e.g. Google docs), website hosting services, cloud computing services (e.g. Google cloud, Amazon™ EC2, etc.). One skilled in the art will realize that the partner networks 123 can be any type of computing systems and networks that can provide computing services to the network environment 104.

The computing systems and network hardware in the environment 100 can be located at any location, whether located at single geographic location or remotely located from each other. For example, the network environment 104 can represent the systems and hardware of a company that is located in multiple geographic locations. As such, one or more of the computing systems and network hardware can be located at one location (e.g. one office of the company) and one or more of the computing systems and network hardware can be located at one or more different locations (e.g. satellite offices of the company).

In embodiments, the owners, administrators, and users of the network environment 104 can desire to identify any security risks or threats in the network environment 104. To identify any security risks, the security tool 101 can be utilized to identify any vulnerabilities in the network environment 104. A vulnerability can be any type of weakness, bug, and/or glitch in the software resources, hardware resources, and/or data of the network environment 104 that can allow the security of the network environment 104 to be compromised. For example, a vulnerability in the software resources can include, for example, software that is out of date, software that has known security weakness, configurations of software that have known security weaknesses, known bugs of software, etc. Likewise, a vulnerability in the hardware resources can include, for example, known bugs in hardware, configurations of hardware that have known security weaknesses, unsecure wireless networks, etc. Additionally, a vulnerability can include weakness in other components and data of the network environment 104 such as unsecure email address, unencrypted data, unsecure websites, etc.

The security tool 101 can be any type of tool that is capable of identifying vulnerabilities in the network environment 104, such as a vulnerability scanner, penetration testing tool, and/or expert. The security tool 101 can be configured as an application program that is capable of being stored on and executed by a computing system, whether part of the network environment 104 or external to the network environment 104. For example, the security tool 101 can be an application program such as NeXpose™ or Metasploit™ from Rapid7, LLC. The security tool 102 can be written in a variety of programming languages, such as JAVA, C++, Python code, Visual Basic, hypertext markup language (HTML), extensible markup language (XML), and the like to accommodate a variety of operating systems, computing system architectures, etc.

Once the vulnerabilities of the network environment 104 have been identified and/or stored to a database, the SR tool 102 can be utilized to recommend approaches to remediate or mitigate the identified vulnerabilities. The approaches can include solutions that remediate or mitigate the identified vulnerabilities and implementations of the solutions in the network environment 104. The SR tool 102 can be configured to receive the identified vulnerabilities of the network environment 104 and information about the network environment 104 and configured to recommend approaches to remediate or mitigate the vulnerabilities in the network environment 104. In embodiments, the SR tool 102 can be configured as an application program that is capable of being stored on and executed by a computing system, whether part of the network environment 104 or external to the network environment 104. Likewise, the SR tool 102 can be configured as a software module that is part of other application programs, such as the security tool 101. In any example, the SR tool 102 can be written in a variety of programming languages, such as JAVA, C++, Python code, Visual Basic, HTML, XML, and the like to accommodate a variety of operating systems, computing system architectures, etc.

To determine approaches to remediate or mitigate the vulnerabilities, the SR tool 102 can be configured to determine a vulnerability class for each vulnerability identified by the security tool 101. The vulnerability class is a classification for common vulnerabilities. For example, vulnerability classes can be software bugs, hardware bugs, unsecure data, out-of-date software, network communication, malware, and the like. To determine the vulnerability class for each vulnerability, the SR tool 102 can be configured to include records and rules that map known and common vulnerabilities to the vulnerability classes. When the SR tool 102 receives the identified vulnerabilities and data describing the identified vulnerabilities, the SR tool 102 can be configured to search the records and rules to determine the vulnerability class for each identified vulnerability.

Once the vulnerability classes are determined for the identified vulnerabilities, the SR tool 102 can be configured to determine solutions for the identified vulnerabilities based on the determined vulnerabilities classes. To achieve this, the SR tool 102 can be configured to maintain a knowledgebase 124. The knowledgebase 124 can be configured to store records of known solutions to vulnerabilities and the vulnerability class or classes that the known solution addresses. The knowledgebase 124 can also be configured to store other information about the known solution such as developer or vendor of the solution, cost of the known solution, complexity of the known solution (e.g. easy or hard to implement, etc.), effectiveness of the known solution (e.g. low security, high security, etc.), and the like.

Figure 2:
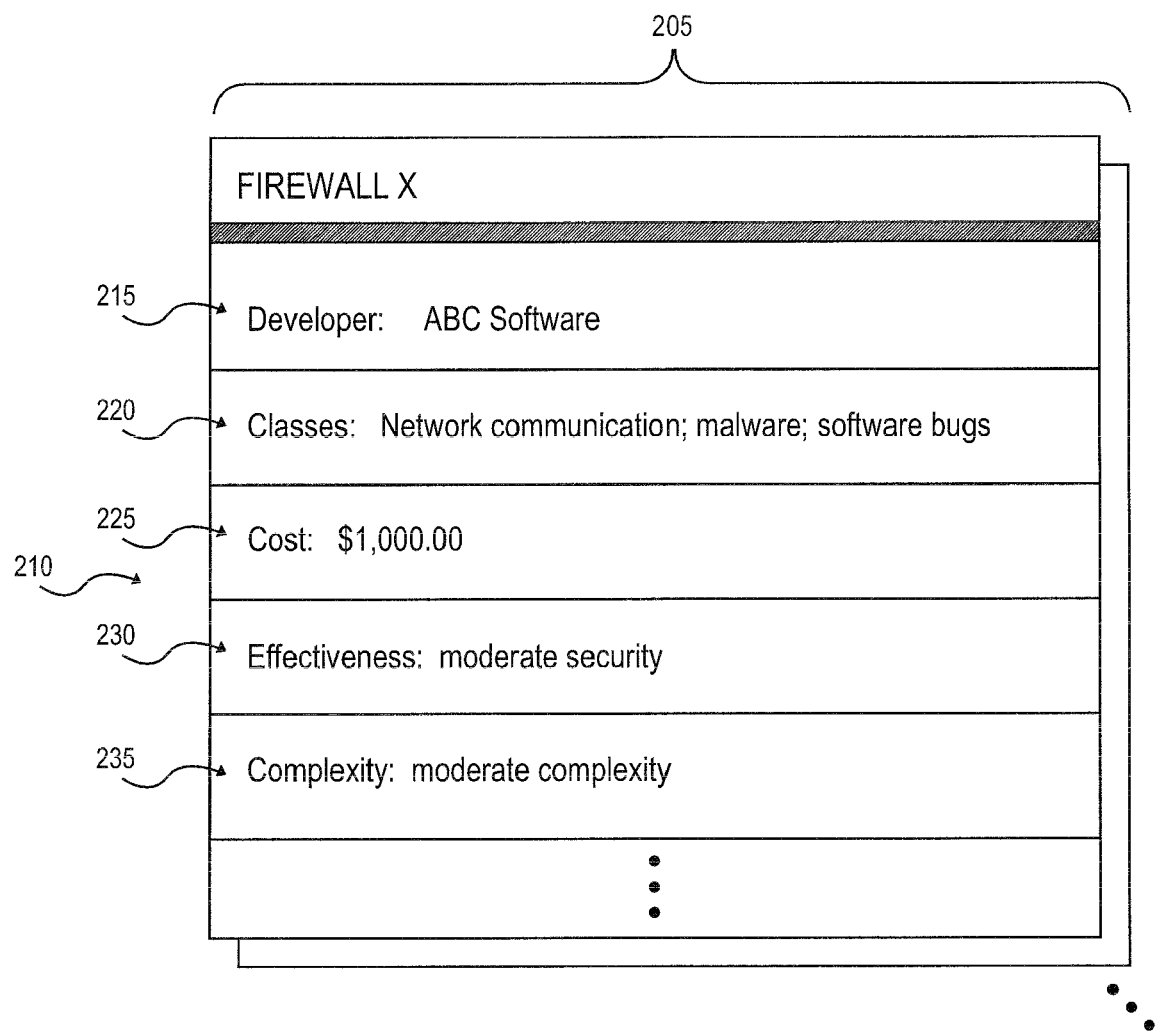
FIG. 2 is a diagram of an exemplary solution knowledgebase, according to various embodiments.

FIG. 2 illustrates an example of the knowledgebase 124 according to embodiments. As illustrated, the knowledgebase 124 can include a set 205 of records 210. Each record 210 can be associated with a particular known solution and can store the information about the particular known solution. For example, as illustrated, record 210 can store information associated with a firewall solution "Firewall X". The record 210 can include various fields that store the information associated with the firewall. For example, the record 210 can include a field 215 that stores a name of the developer or vendor of the firewall: "ABC software." The record 210 can include a field 220 that stores the vulnerability classes that the firewall addresses: "network communication, malware, software bugs." The record 210 can also include a field 225 that stores the cost of the firewall: "$1,000.00." The record 210 can also include a field 230 that stores the effectiveness of the firewall: "moderate security." The record 210 can include a field 235 that stores the complexity of implementation of the firewall: "moderate complexity." While FIG. 2 illustrates various information and data that can be included in the knowledgebase 124, one skilled in the art will realize that the knowledgebase 124 can include any information and data associated with known solutions.

To generate and maintain the knowledgebase 124, the SR tool 102 can be configured to receive specifications of known solutions from developers or vendors 126 of the known security solutions. The SR tool 102 can be configured to receive the specifications from the developers and vendors 126 in a common language, for example XML, which specifies the information about a known solution. The information can include information such as name of the developer or vendor, name of the known solution, vulnerability class or classes addressed by the known solution, cost of the known solution, effectiveness of the known solution, implementation complexity. The SR tool 102 can be configured to receive the specification in any format, such as a machine-readable file, via any type of communication channel, such as network 122. Once the SR tool 102 receives one or more specifications of known solutions, the SR tool 102 can be configured to generate a new entry in the knowledgebase 124 for the known solution or update an entry if it already exists.

To determine solutions to remediate or mitigate the identified vulnerabilities, the SR tool 102 can be configured to search the knowledgebase 124 to determine one or more solutions stored in the knowledgebase 124 that match the vulnerability classes of the identified vulnerabilities. Once determined, the SR tool 102 can be configured to extract information about the matching solutions from the knowledgebase 124. To achieve this, the SR tool 102 can be configured to include the necessary logic, commands, instructions and routines to search the knowledgebase 124 and extract information from the knowledgebase 124.

Once the one or more solutions are determined, to determine the approaches, the SR tool 102 can be configured to determine implementations for the one or more solutions. The implementations can include a description of how the one or more solutions will be incorporated in the network environment 104. The SR tool 102 can be configured to determine the implementations based on the information about the network environment 104, such as the hardware contained in the network environment 104, the software contained in the network environment 104, the structure of the network environment 104 (e.g. network topology), and the like. Likewise, the SR tool 102 can be configured to maintain rules describing how different solutions can be used in on different hardware and software and in different network structures.

In embodiments, once the approaches to remediate or mitigate the identified vulnerabilities are determined (e.g. the solution and implementation of the solutions), the SR tool 102 can be configured to prioritize the approaches based on an efficiency of the approaches, effectiveness of the approaches, and/or other factors or criteria. Prioritization can be any type of analysis that ranks the approaches based on how efficiently or effectively the approaches remediate or mitigate the vulnerabilities. Additionally, prioritization can utilize other factors or criteria such as cost, effort, and the like. To achieve this, the SR tool 102 can be configured to include the necessary logic, commands, instructions and routines to perform analysis that ranks the approaches based on how efficiently or effectively the approaches remediate or mitigate the vulnerabilities and/or based on other factors or criteria. For example, the SR tool 102 can be configured to prioritize the approaches that maximize the vulnerabilities remediated or mitigated while minimizing the number of approaches required to remediate or mitigate the vulnerabilities. For instance, if the network environment 104 contains multiple vulnerabilities, the SR tool 102 can prioritize the approaches based on the approaches that will remediate or mitigate a maximum number of vulnerabilities, whether in the same or different classes (e.g. rank the approaches higher that remediate or mitigate more vulnerabilities). Likewise, for example, the SR tool 102 can be configured to prioritize the approaches that maximize the vulnerabilities remediated or mitigated, which are critical (e.g. rank the approaches higher that remediate or mitigate more critical vulnerabilities). One skilled in the art will realize that the SR tool 102 can be configured to perform any type of analysis to prioritize the approaches based of efficiency and/or effectiveness.

In embodiments, once the approaches are prioritized, the SR tool 102 can be configured to recommend and/or select one or more approaches to address the identified vulnerabilities based on constraints. The constraints can be any conditions that can be utilized to select the approaches. For example, the constraints can include cost (e.g. specific cost, minimized cost, etc.), implementation complexity (e.g. easy implementation, moderate implementation, etc.), effectiveness (e.g. low security, moderate security, high security), and the like. The SR tool 102 can be configured to receive the constraints from a user of the SR tool 102 and/or a user or administrator of the network environment 104. To achieve this, the SR tool 102 can be configured to include the necessary logic, commands, instructions and routines to generate and communicate with graphical user interfaces (GUIs) and/or command line interfaces to receive the constraints.

To recommend and/or select the approaches based on the constraints, the SR tool 102 can be configured to determine all the approaches that match the vulnerability classes of the identified vulnerabilities and to prioritize the approaches as described above. Once all the approaches have been determined and prioritized, the SR tool 102 can be configured to recommend and/or select particular solutions that meet the constraints and have the highest prioritization. The SR tool 102 can be configured to compare the constraints to the information contained in the knowledgebase 124 to recommend and/or select the particular approaches that meet the constraints.

For example, the SR tool 102 can receive details about a vulnerability in the network environment 104 that all the computing systems 114 and 116 contain a software bug that allows an attacker to establish network communications with the computing systems 114 and 116. The SR tool 102 can determine that the vulnerability falls within the vulnerability classes of network communication and software bugs. The SR tool 102 can determine, based on the vulnerability classes, that two solutions exist: a software patch for the computing systems 114 and 116 and a firewall to block the network communications allowed by the software bug. The SR tool 102 can determine the implementations for the solutions. For instance, in this example, when determining that the firewall solution, the SR tool 102 can determine that the location for the firewall is on the gateway 118 because all network communication from the computing systems 114 and 116 must pass through the gateway 118. Likewise, the SR tool 102 can determine that the software patch must be implemented on each of the computing systems 114 and 116. In this example, the SR tool 102 can prioritize the determined approaches. For instance, the SR tool 102 can prioritize the firewall higher than the software patches because the firewall more efficiently remediates or mitigates the vulnerabilities.

In this example, the SR tool 102 can receive the constraints that the solution should minimize cost and while maintaining moderate security. The SR tool 102 can determine the approach that matches the constraints based on the information contained in the knowledgebase 124. For instance, the SR tool 102 can examine the knowledgebase 124 and determine that a firewall costs $1,000.00 and has moderate security and that a software patch costs $10.00 per computing system and has high security. Then, for example, the SR tool 102 can determine that the overall cost of the software patch costs $5,000.00 based on the number of computing systems 114 and 116 being 500 (500*$10.00 per computing system). Accordingly, the SR tool 102 can recommend and/or select that the firewall approach is the approach that meets the constraints of minimized cost and moderate security.

While the above example describes the SR tool 102 prioritizing the approaches based on most vulnerabilities remediated or mitigated, one skilled in the art will realize that the SR tool 102 can prioritize the approaches based on any efficiency and/or effectiveness such as remediating critical vulnerabilities. Likewise, while the above example describes the SR tool 102 recommending and/or selecting an approach based on two particular constraints, one skilled in the art will realize that the SR tool 102 can recommend and/or select approaches based on any number of constraints.

In embodiments, when determining, prioritizing, recommending, and/or selecting the approaches, the SR tool 102 can be configured to utilize expert systems and heuristics in determining, prioritizing, recommending, and selecting the approaches (e.g. the one or more solution and the implementations). For example, as the approaches are determined, prioritized, recommended, and selected for different network environments, the SR tool 102 can be configured to record the approaches and how they were determined, prioritized, recommended, and selected to be used in future determinations. Likewise, for example, the SR tool 102 can be configured to utilize simpler version of the network structure and/or determine closest matching solutions and/or implantations when determining, prioritizing, recommending, and selecting the approaches. To achieve this, the SR tool 102 can be configured to include the necessary logic, commands, instructions and routines to perform analysis based on heuristics and expert systems techniques, algorithms, and rules in order to determine, prioritize, recommend and/or select the approaches.

Once the SR tool 102 has recommended and/or selected the approaches, the SR tool 102 can be configured to provide the approaches to a user of the SR tool 102 and/or a user or administrator of the network environment 104. To achieve this, the SR tool 102 can be configured to include the necessary logic, commands, instructions and routines to generate and communicate with GUIs and/or command line interfaces to display the approaches and information about the approaches. Likewise, the SR tool 102 can be configured include the necessary logic, commands, instructions and routines to output information in other formats, such as email, hypertext mark-up language (HTML) document, text or word processing document, and the like.

Additionally, once the SR tool 102 has selected the approaches, the SR tool 102 can be configured to provide the approaches to third-parties to evaluate the approaches. The third-parties can evaluate the approaches to identify if the approaches are secure, are the best approaches, suggest alternative approaches, and the like. To maintain the security and confidentially of the entity associated with the network environment, the SR tool 102 can be configured to provide the approaches and details of the network environment 104, anonymously. For example, the SR tool 102 can be configured to remove any information that identifies the entity and/or any private, secret, secure, and/or confidential information from the solutions, implementations, and details of the network environment 104 provided to the third parties. To achieve this, the SR tool 102 can be configured to include the necessary logic, commands, instructions and routines to communicate with the third parties via the network 122.

As illustrated, the third parties can include security experts 128 and public forums 130. The SR tool 102 can be configured to communicate with one or more the security experts 128 via the network 122. The security experts 128 can evaluate the approaches and details of the network environment 104 and provide the evaluation to the SR tool 102. Likewise, the SR tool 102 can be configured to provide the approaches and details of the network environment 104 to public forums 130, such as such as websites. The SR tool 102 can receive public comments on the solutions, implementations, and details of the network environment 104 from the public forums 130.

When the evaluations are received, the SR tool 102 can be configured to include the evaluations with the approaches to remediate or mitigate the vulnerabilities. Likewise, the SR tool 102 can be configured to modify the approaches based on the evaluations. For instance, in the above example, if the security experts comment that the firewall approach also has a flaw and therefore considered low security, the SR tool 102 can determine that the firewall no longer meets the constraints of moderate security and can determine that the software patch approach is the approach that meets the constraints.

In embodiments, the SR tool 102 can be configured to utilize the evaluations receive from the third-parties when performing future approaches determination, prioritization, and selection. The SR tool 102 can be configured to update the knowledgebase 124 based on the evaluations. For example, if the third-parties evaluate that a solution has an effectiveness or complexity different than the knowledgebase 124, the SR tool 102 can to update the knowledgebase 124 based on the evaluation. Likewise, the SR tool 102 can be configured to utilize the evaluations in further analysis by the expert systems and heuristics.

In embodiments, as described herein, the SR tool 102 can be implemented and executed on any of the computing systems of network environment 104. Likewise, the SR tool 102 can be implemented and executed on a remote computing system connected to the network environment 104 by the network 122. Additionally, the SR tool 102 can be offered as a service under any type of Software as a Service (SAAS) model. When configured as an application program or software module, the SR tool 102 can be stored on any type of computer readable storage medium, such as hard drives, optical storage, system memory, and the like, of the computing systems.

Figure 3:
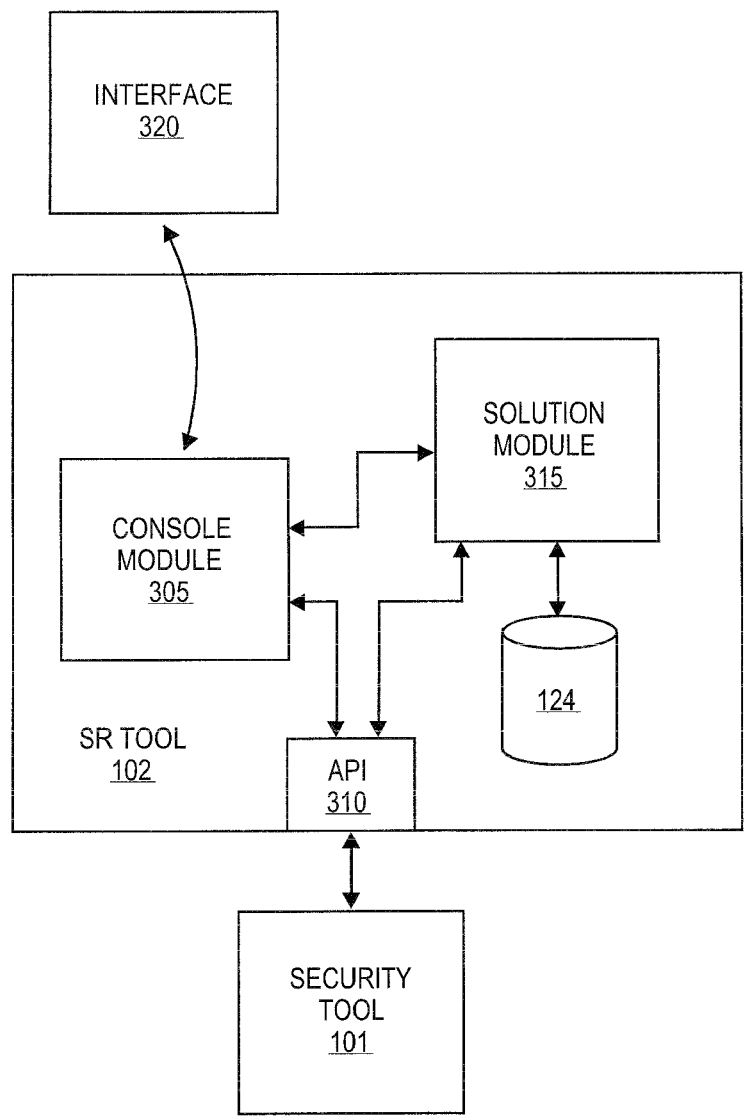
FIG. 3 is a block diagram of an exemplary configuration of the solution recommendation tool, according to various embodiments.

FIG. 3 is a block diagram of an exemplary configuration of the SR tool 102. As illustrated, the SR tool 102 can include a console module 305, an application programming interface (API) 310, and a solution module 315. While FIG. 3 illustrates various components of the SR tool 102, one skilled in the art will realize that existing components can be removed or additional components added.

The console module 305 can be configured to provide an interface 320 to the SR tool 102. The console module 305 can be configured to generate the interface 320 that allows a user to initiate the SR tool 102, operate the SR tool 102, such as enter information about the network environment 104, and provide information such as the determined approaches. To achieve this, the console module 305 can be configured to include the necessary logic, commands, instructions and routines to generate and communicate with GUIs and/or command line interfaces. Likewise, the console module 305 can be configured include the necessary logic, commands, instructions and routines to output information in other formats, such as email, HTML document, text or word processing document, and the like. Additionally, the console module 305 can be configured to communicate with the developers/vendors 126, security experts 128, and/or public forums 130 to receive information about approaches and to provide and receive evaluations of approaches. To achieve this, the console module 305 can be configured to include the necessary logic, commands, instructions and routines to communicate with the developers/vendors 126, security experts 128, and/or public forums 130 using any type of well-known network protocols supported by the network 122.

The console module 305 can communicate with the API 310. The API 310 can provide an interface to the security tool 101 to receive the vulnerabilities identified by the security tool 101 and any information about the network environment 104 identified or collected by the security tool 101. To achieve this, the API 310 can be configured to include the necessary logic, commands, instructions and routines to provide the interface to the security tool 101 to receive the vulnerabilities identified by the security tool 101 and any information about the network environment 104 identified or collected by the security tool 101.

The console module 305 can also communicate with the solution module 315. The solution module 315 can be configured to include the necessary logic, commands, instructions and routines to determine the approaches as described above. Likewise, the solution module 315 can be configured to include the necessary logic, commands, instructions and routines to create, maintain, modify, search, and query the knowledgebase 124.

In embodiments, as illustrated in FIG. 3, the console module 305, the API 310, and the solution module 315 can be implemented in a single application program capable of executing on a computing systems of environment 100. Likewise, the console module 305, the API 310, and the solution module 315 can be implemented as separate application programs that are capable of executing on separate computing systems of the environment 100. In any implementation, the SR tool 102 can be stored any type of computer readable storage medium, such as hard drives, optical storage, system memory, and the like, of the computing systems of the environment 100. Likewise, the components of the SR tool 102 can incorporated into other application programs such as the security tool 101.

Figure 4:
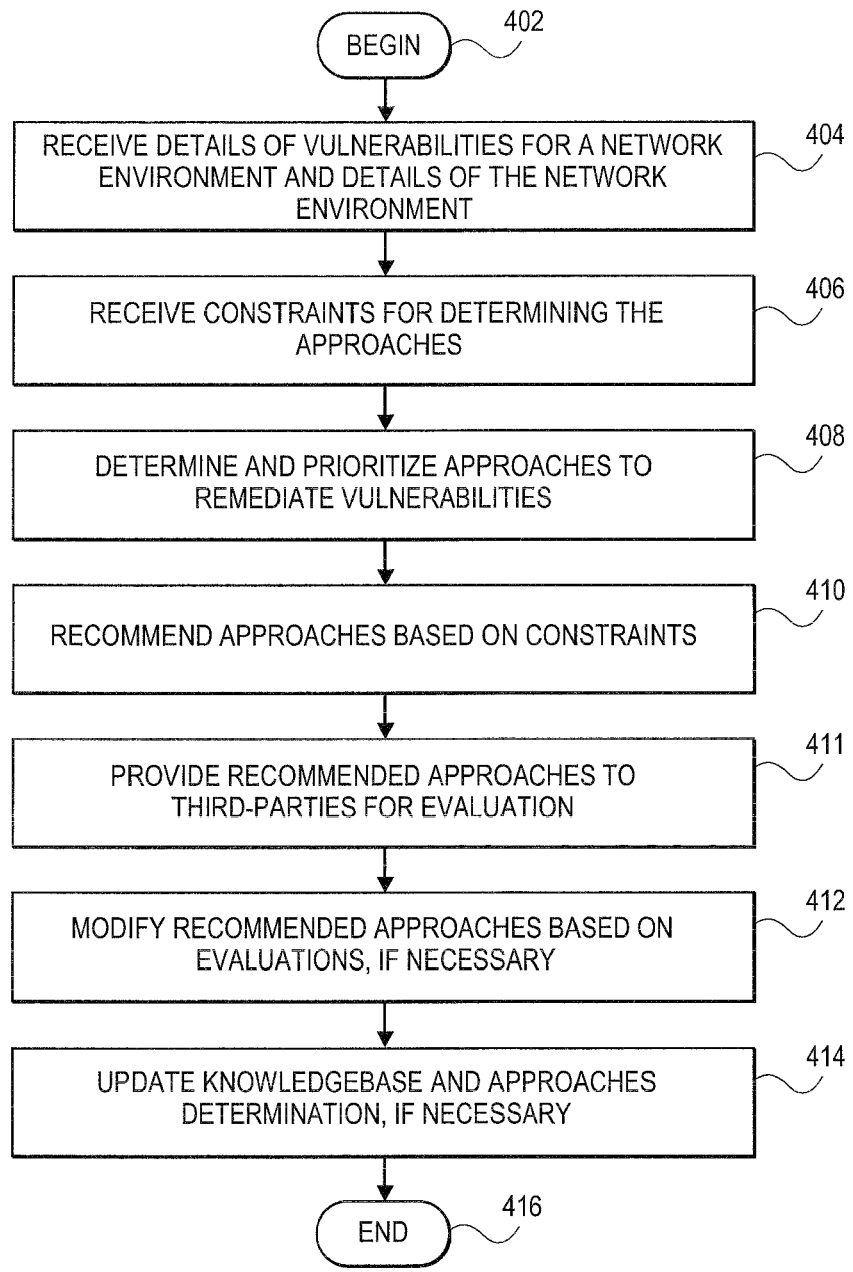
FIG. 4 is a flow diagram of exemplary processes performed by the solution recommendation tool, according to various embodiments.

As mentioned above, the SR tool 102 can be configured to determine, prioritize, and select approaches to remediate or mitigate security threats to the network environment 104. FIG. 4 is a flow diagram that illustrates an exemplary process by which SR tool 102 can determine, prioritize, and select approaches to remediate or mitigate security threats to the network environment 104. In 402, the process can begin.

In 404, the SR tool 102 can receive details of vulnerabilities in the network environment 104 and details of the network environment 104. The SR tool 102 can receive the details from the security tool 101. The details of the vulnerabilities can include a list of the vulnerabilities and description of the vulnerabilities (e.g. type of vulnerability, location in the network environment 104, etc.). The details of the network environment can include the hardware contained in the network environment 104, the software contained in the network environment 104, and the structure of the network environment 104 (e.g. network topology).

In 406, the SR tool 102 can receive constraints for determining the approaches to remediate or mitigate the vulnerabilities. The constraints can be any conditions that can be utilized to determine the approaches. For example, the constraints can include cost (e.g. specific cost, minimized cost, etc.), implementation complexity (e.g. easy implementation, moderate implementation, etc.), and effectiveness (e.g. low security, moderate security, high security). The SR tool 102 can receive the constraints from a user of the SR tool 102 and/or a user or administrator of the network environment 104.

In 408, the SR tool 102 can determine and prioritize approaches to remediate or mitigate the vulnerabilities. For example, the SR tool 102 can determine the vulnerability classes for the vulnerabilities. The vulnerability class is a classification for common vulnerabilities. For example, vulnerability classes can be software bugs, hardware bugs, unsecure data, out-of-date software, network communication, malware, and the like. To determine the vulnerability class for each vulnerability, the SR tool 102 can include records and rules that map known and common vulnerabilities to the vulnerability classes. Then, the SR tool 102 can determine approaches (solutions and implementations) based on the vulnerability classes. The SR tool 102 can maintain a knowledgebase 124, which stores records of known solutions to vulnerabilities and the vulnerability class or classes that the known solution addresses. The knowledgebase 124 can store other information about the known solution such as developer or vendor of the solution, cost of the known solution, complexity of the known solution (e.g. easy or hard to implement, etc.), effectiveness of the known solution (e.g. low security, high security, etc.), and the like.

To determine all solutions for the identified vulnerabilities, the SR tool 102 can search the knowledgebase 124 to determine one or more solutions stored in the knowledgebase 124 that match the vulnerability classes of the identified vulnerabilities. Once determined, the SR tool 102 can extract information about the matching solutions from the knowledgebase 124. The SR tool 102 can determine the implementations for the determined solutions based on the information about the network environment 104, such as the hardware contained in the network environment 104, the software contained in the network environment 104, the structure of the network environment 104 (e.g. network topology), etc. Likewise, the SR tool 102 can maintain rules describing how different solutions can be used in on different hardware and software and in different network structures. The implementations can include a description of how the one or more solution will be incorporated in the network environment 104.

Once all the approaches are determined (solutions and implementations), the SR tool 102 can prioritize the determined approaches. The SR tool 102 can prioritize the approaches based on an efficiency of the approaches, effectiveness of the approaches, and/or other factors or criteria. Prioritization can be any type of analysis that ranks the approaches based on how efficiently or effectively the approaches remediate or mitigate the vulnerabilities. Additionally, prioritization can utilize other factors or criteria such as cost, effort, and the like.

In 410, the SR tool 102 can recommend one or more of the approaches based on the constraints. Once all the approaches have been determined and prioritized, the SR tool 102 can recommend the approaches that meet the constraints and have been prioritized the highest. The SR tool 102 can compare the constraints to the information contained in the knowledgebase 124 to recommend the one or more approaches that meet the constraints.

In 412, the SR tool 102 can provide the recommended approaches to third-parties for evaluation. The third-parties can evaluate the recommended approaches to identify if the recommended approaches are secure, are the best approaches, suggest alternative approaches, and the like. To maintain the security and confidentially of the entity associated with the network environment, the SR tool 102 can provide the recommended approaches and details of the network environment 104, anonymously. For example, the SR tool 102 can remove any information that identifies the entity and/or any private, secret, secure, and/or confidential information from the solutions, implementations, and details of the network environment 104 provided to the third parties.

In 414, the SR tool 102 can modify the recommended approaches based on the evaluations, if necessary. For example, if the third-parties evaluate the recommended approaches negatively, the SR tool 102 can modify the recommended approaches and/or determine new approaches. In 416, the SR tool 102 can update the knowledgebase and approaches determination based on the evaluations, if necessary.

In 418, the process can end, return to any point or repeat.

FIG. 5 illustrates an exemplary block diagram of a computing system 500 which can be implemented to store and execute the SR tool 102 and/or the security tool 101 according to various embodiments. In embodiments, the SR tool 102 and/or the security tool 101 can be stored and executed on the computing system 500 in order to perform the process described above. The computing systems 500 can represent an example of any computing systems in the environment 100. While FIG. 5 illustrates various components of the computing system 500, one skilled in the art will realize that existing components can be removed or additional components can be added.

As shown in FIG. 5, the computing system 500 can include one or more processors, such as processor 502 that provide an execution platform for embodiments of the SR tool 102 and/or the security tool 101. Commands and data from the processor 502 are communicated over a communication bus 504. The computing system 500 can also include a main memory 506, for example, one or more computer readable storage media such as a Random Access Memory (RAM), where the SR tool 102, the security tool 101 and/or other application programs, such as an operating system (OS) can be executed during runtime, and can include a secondary memory 508. The secondary memory 508 can include, for example, one or more computer readable storage media or devices such as a hard disk drive 510 and/or a removable storage drive 512, representing a floppy diskette drive, a magnetic tape drive, a compact disk drive, etc., where a copy of a application program embodiment for the SR tool 102 and/or the security tool 101 can be stored. The removable storage drive 512 reads from and/or writes to a removable storage unit 514 in a well-known manner. The computing system 500 can also include a network interface 516 in order to connect with any type of network, whether wired or wireless.

In embodiments, a user can interface with the computing system 500 and operate the SR tool 102 and/or the security tool 101 with a keyboard 518, a mouse 520, and a display 522. To provide information from the computing system 500 and data from the SR tool 102 and/or the security tool 101, the computing system 500 can include a display adapter 524. The display adapter 524 can interface with the communication bus 504 and the display 522. The display adapter 524 can receive display data from the processor 502 and convert the display data into display commands for the display 522.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A non-transitory computer readable storage medium comprising program instructions executable to:

receive a plurality of vulnerabilities associated with a network;

determine a first vulnerability class for a first set of the plurality of vulnerabilities and a second vulnerability class for a second set of the plurality of vulnerabilities based on records and rules that map the plurality of vulnerabilities to at least the first vulnerability class and the second vulnerability class;
receive a plurality of constraints to mitigate the plurality of vulnerabilities based on a cost, an implementation complexity, and an effectiveness;
based on the plurality of constraints, determining a plurality of prioritized processes that match both the first vulnerability class and the second vulnerability class;
generate a first set of prioritized processes from the plurality of prioritized processes for the first vulnerability class to mitigate the first set of the plurality of vulnerabilities and a second set of prioritized processes from the plurality of prioritized processes for the second vulnerability class to mitigate the second set of the plurality of vulnerabilities based on the cost, the implementation complexity, and the effectiveness by configuring the first set of prioritized processes and the second set of prioritized processes to maximize mitigation of a total number of plurality of vulnerabilities and minimize a total number of the plurality of prioritized processes required for the mitigation;
transmit the first set of prioritized processes and the second set of prioritized processes to a third-party computing system that is not part of the network for evaluation;
receive, from the third-party computing system, the evaluation of the first set of prioritized processes and the second set of prioritized processes;
modify first set of prioritized processes and the second set of prioritized processes, based on the evaluation, to maximize the mitigation of the total number of plurality of vulnerabilities and minimize the total number of the plurality of prioritized processes required for the mitigation; and
transmit the modified first set of prioritized processes and the modified second set of prioritized processes to a computing system in the network.

2. A system comprising:
one or more processors; and
a memory coupled to the one or more processors, wherein the memory stores program instructions executable by the one or more processors to:
receive a plurality of vulnerabilities associated with a network;
determine a first vulnerability class for a first set of the plurality of vulnerabilities and a second vulnerability class for a second set of the plurality of vulnerabilities based on records and rules that map the plurality of vulnerabilities to at least the first vulnerability class and the second vulnerability class;
receive a plurality of constraints to mitigate the plurality of vulnerabilities based on a cost, an implementation complexity, and an effectiveness;
based on the plurality of constraints, determining a plurality of prioritized processes that match both the first vulnerability class and the second vulnerability class;
generate a first set of prioritized processes from the plurality of prioritized processes for the first vulnerability class to mitigate the first set of the plurality of vulnerabilities and a second set of prioritized processes from the plurality of prioritized processes for the second vulnerability class to mitigate the second set of the plurality of vulnerabilities based on the cost, the implementation complexity, and the effectiveness by configuring the first set of prioritized processes and the second set of prioritized processes to maximize mitigation of a total number of plurality of vulnerabilities and minimize a total number of the plurality of prioritized processes required for the mitigation;
transmit the first set of prioritized processes and the second set of prioritized processes to a third-party computing system that is not part of the network for evaluation;
receive, from the third-party computing system, the evaluation of the first set of prioritized processes and the second set of prioritized processes;
modify first set of prioritized processes and the second set of prioritized processes, based on the evaluation, to maximize the mitigation of the total number of plurality of vulnerabilities and minimize the total number of the plurality of prioritized processes required for the mitigation; and
transmit the modified first set of prioritized processes and the modified second set of prioritized processes to a computing system in the network.

3. A computer-implemented method, comprising:
receiving a plurality of vulnerabilities associated with a network;
determining a first vulnerability class for a first set of the plurality of vulnerabilities and a second vulnerability class for a second set of the plurality of vulnerabilities based on records and rules that map the plurality of vulnerabilities to at least the first vulnerability class and the second vulnerability class;
receiving a plurality of constraints to mitigate the plurality of vulnerabilities based on a cost, an implementation complexity, and an effectiveness;
based on the plurality of constraints, determining a plurality of prioritized processes that match both the first vulnerability class and the second vulnerability class;
generating a first set of prioritized processes from the plurality of prioritized processes for the first vulnerability class to mitigate the first set of the plurality of vulnerabilities and a second set of prioritized processes from the plurality of prioritized processes for the second vulnerability class to mitigate the second set of the plurality of vulnerabilities based on the cost, the implementation complexity, and the effectiveness by configuring the first set of prioritized processes and the second set of prioritized processes to maximize mitigation of a total number of plurality of vulnerabilities and minimize a total number of the plurality of prioritized processes required for the mitigation;
transmitting the first set of prioritized processes and the second set of prioritized processes to a third-party computing system that is not part of the network for evaluation;
receiving, from the third-party computing system, the evaluation of the first set of prioritized processes and the second set of prioritized processes;
modifying first set of prioritized processes and the second set of prioritized processes, based on the evaluation, to maximize the mitigation of the total number of plurality of vulnerabilities and minimize the total number of the plurality of prioritized processes required for the mitigation; and
transmitting the modified first set of prioritized processes and the modified second set of prioritized processes to a computing system in the network.

* * * * *